(12) United States Patent
Heimann et al.

(10) Patent No.: US 10,093,878 B2
(45) Date of Patent: Oct. 9, 2018

(54) BIOMASS APPARATUS AND METHOD WITH PRE-TREATMENT AND REFLUX CONDENSER

(71) Applicant: Enginuity Worldwide, LLC, Mexico, MO (US)

(72) Inventors: Robert L. Heimann, Centralia, MO (US); Allison Talley, Mexico, MO (US)

(73) Assignee: ENGINUITY WORLDWIDE, LLC., Mexico, MO (US)

( * ) Notice: Subject to any disclaimer, the term of this patent is extended or adjusted under 35 U.S.C. 154(b) by 0 days.

(21) Appl. No.: 15/066,894

(22) Filed: Mar. 10, 2016

(65) Prior Publication Data

US 2016/0264897 A1  Sep. 15, 2016

Related U.S. Application Data

(60) Provisional application No. 62/130,820, filed on Mar. 10, 2015.

(51) Int. Cl.
*C10L 9/08* (2006.01)
*C10L 5/44* (2006.01)
(Continued)

(52) U.S. Cl.
CPC .................... *C10L 9/08* (2013.01); *C10L 5/44* (2013.01); *C10L 5/442* (2013.01); *C10L 5/445* (2013.01); *C10L 9/02* (2013.01); *F26B 3/36* (2013.01); *C10L 2200/0469* (2013.01); *C10L 2290/02* (2013.01); *C10L 2290/06* (2013.01); *C10L 2290/08* (2013.01); *C10L 2290/24* (2013.01);
(Continued)

(58) Field of Classification Search
CPC combination set(s) only.
See application file for complete search history.

(56) References Cited

U.S. PATENT DOCUMENTS 8,476,480 B1  7/2013  Brown et al.
8,667,706 B2  3/2014  Smith et al.
(Continued)

FOREIGN PATENT DOCUMENTS

| WO | 2009102131 | 8/2009 |
|----|------------|--------|
| WO | 2011100695 | 8/2011 |
| WO | 2014027809 | 2/2014 |

OTHER PUBLICATIONS

ISRWO of PCT/US2016/021820 dated Nov. 9, 2016.
(Continued)

*Primary Examiner* — Ellen M McAvoy
*Assistant Examiner* — Chantel L Graham
(74) *Attorney, Agent, or Firm* — Burris Law, PLLC

(57) ABSTRACT

A method of drying a moisture-containing or water-laden biomass material is provided that includes the steps of sending the biomass material into an apparatus having a feeding device, a rotary biomass dryer, a reflux condenser, an aftercooler, and an exit mechanism. The biomass material may be pretreated, and then heated in order to separate the moisture-containing or water laden biomass material into steam and dry biomass material. The steam is removed as the steam and the dry biomass material passes through the reflux condenser, the dry biomass is cooled in the aftercooler stage, and the dry biomass material is collected after exiting the apparatus through the exit mechanism.

18 Claims, 4 Drawing Sheets

(51) Int. Cl.
*F26B 3/36* (2006.01)
*C10L 9/02* (2006.01)
(52) U.S. Cl.
CPC ....... *C10L 2290/30* (2013.01); *C10L 2290/50* (2013.01); *F26B 2200/02* (2013.01); *F26B 2200/24* (2013.01); *Y02E 50/10* (2013.01); *Y02E 50/30* (2013.01)

(56) References Cited

U.S. PATENT DOCUMENTS

| | | | |
|---|---|---|---|
| 9,140,945 B2 | 9/2015 | Kitajima et al. | |
| 2012/0217442 A1 | 8/2012 | Jeney | |
| 2014/0173929 A1* | 6/2014 | Olofsson | C10L 9/083 34/389 |
| 2014/0208995 A1* | 7/2014 | Olofsson | F26B 23/022 110/222 |
| 2015/0007446 A1 | 1/2015 | Heimann | |
| 2015/0184098 A1 | 7/2015 | Talwar | |

OTHER PUBLICATIONS

ISRWO of PCT/US2016/029620 dated Jul. 5, 2016.
Bridgwater, A.V.; Peacocke, G.V.C. 2000. Fast pyrolysis processes for biomass. Renewable and Sustainable Energy Reviews. vol. 4: pp. 1-73.
Demirbas, Ayhan. 2007. The influence of temperature on the yields of compounds existing in bio-oils obtained from biomass samples via pyrolysis. Fuel Processing Technology. vol. 88(6): pp. 591-597.
Yasuhara, Akio; Sugiura, Ginji. 1987. Volatile Compounds in Pyroligneous Liquids from Karamatsu and Chishima-sasa. Agricultural and Biological Chemistry. vol. 51(11): pp. 3049-3060.
Azargohar, R.; Dalai, A.K. 2006. Biochar as a precursor of activated carbon. Appl. Biochem. Biotechnol. vol. 129-132: 762-773.
Dalai, Ajay K.; Azargohar, R. 2007. Production of Activated Carbon from Biochar Using Chemical and Physical Activation: Mechanism and Modeling. Materials, Chemicals, and Energy from Forest Biomass. Chapter 29: pp. 463-476.
Azargohar, R.; Dalai, A.K. 2008. Steam and Koh activation of biochar: Experimental and modeling studies. Microporous and Mesoporous Materials. vol. 110 (2-3): pp. 413-421.
Sadaka, Samy; Boateng, A.A. Pyrolysis and Bio-Oil. Agriculture and Natural Resources. University of Arkansas Division of Agriculture FSA #1052. Accessed on May 2016 at < http://www.uaex.edu/publications/pdf/fsa-1052.pdf>.
Hagner, Marleena. 2013. Potential of the slow pyrolysis products birch tar oil, wood vinegar and biochar in sustainable plant protection—pesticide effects, soil improvement and environmental risks. Academic Dissertation in Environmental Ecology. Presented Sep. 20, 2013 at the University of Helsinki.
Czernik, S.; Bridgwater, A.V. 2004. Overview of Applications of Biomass Fast Pyrolysis Oil. Energy and Fuels. vol. 18: pp. 590-598.
Diebold, J.P. 1997. Overview of Fast Pyrolysis of Biomass for the Production of Liquid Fuels. Developments in Thermochemical Biomass Conversion. Chapter: pp. 5-26.
Xiu, Shuangning; Shahbazi, Abolghasem. 2012. Bio-oil Production and Upgrading Research: A Review. Renewable and Sustainable Energy Reviews. vol. 16: pp. 4406-4414.
Bridgwater, A.V.; Peacocke, G.V.C. Engineering Developments in Fast Pyrolysis for Bio-oils. Biomass Pyrolysis Oil Properties and Combustion Meeting in Golden, CO. Accessed on Jun. 21, 2016 at < http://digital.library.unt.edu/ark:/67531/metadc665006/m1/121/>.
Bridgwater, A.V. 1999. Principles and practice of biomass fast pyrolysis processes for liquids. Journal of Analytical and Applied Pyrolysis. vol. 51: pp. 3-22.

* cited by examiner

BIOMASS APPARATUS AND METHOD WITH PRE-TREATMENT AND REFLUX CONDENSER

CROSS-REFERENCE TO RELATED APPLICATIONS

This application claims the benefit of provisional application Ser. No. 62/130,820, filed on Mar. 10, 2015, the entire contents of which are incorporated herein by reference in their entirety.

FIELD

The present disclosure relates generally to an apparatus and method used to process biomass materials. More specifically, this disclosure relates to equipment and methods that improve properties or performance of biomass materials and the development of additional energy bi-products from the processing thereof.

BACKGROUND

The statements in this section merely provide background information related to the present disclosure and may not constitute prior art.

A rotary biomass dryer provides a low cost alternative to conventional biomass drying which requires significant energy inputs. The rotary biomass dryer requires no external energy, only a motor to rotate the compression auger effectively heating the biomass by compression and friction to generate in-situ steam. Additionally, none of the conventional drying methods can increase the BTU content of biomass material.

Biomass materials, either woody or non-woody, lack the energy density of coal. Therefore, methods have been developed over the years to increase the energy density including Hydrothermal Carbonization (HTC), Ammonia Fiber Explosion (AFEX), torrefaction, and steam explosion. Each of these methods requires significant external energy input to cause an increase in energy density.

SUMMARY

The present disclosure generally provides an apparatus and a method for drying a moisture-containing or water-laden biomass material. The apparatus comprises a feeding device, a rotary biomass dryer, a reflux condenser, an aftercooler stage, and an exit mechanism. In one form of the present disclosure, the biomass material is subjected to a pretreatment involving in-situ acid or basic treatment and optionally, inorganic sequestering.

In one form, the present disclosure provides a method of drying a moisture-containing biomass material using the apparatus as described herein, including feeding moisture-containing biomass material into the feeding device, pretreating the biomass material, heating the moisture-containing biomass material in the rotary biomass dryer to separate the moisture-containing biomass material into steam and dry biomass material, removing the steam from the apparatus as the steam and the dry biomass material passes through the reflux condenser, cooling the dry biomass material in the aftercooler, and collecting the dry biomass material after exiting the apparatus through the exit mechanism.

According to additional forms of the present disclosure, the apparatus may comprise a crammer feeder, and in one form a funnel feeder, an in-feed mixer, a preheater, or a dual-belt feeder. The dual belt feeder generally comprises a top belt that levels the inflow of moisture-containing or water-laden biomass material by raking or leveling and a lower belt that provides metered feed provisions to the rotary biomass dryer. The apparatus may also comprise a mixer located prior to the feeding device in order to mix together more than one moisture-containing or water-laden biomass material.

According to another aspect of the present disclosure, the rotary biomass dryer comprises a multiple screw design capable of co-rotating or counter rotation. Alternatively, the rotary biomass dryer comprises a fixed screw design with a rotating barrel. The rotary biomass dryer may also include a screw with a compression zone having a blind aperture extending from a drive end, optionally, near the compression zone end of the screw, with appropriate provisions for receiving a liquid filter, such as by way of example a "banjo" style rotary liquid filter. A hollow device may be used to deliver cooling fluid to the opposite end of the blind aperture.

According another aspect of the present disclosure, pretreatment of biomass materials involves in-situ acid or basic treatment. Alternatively, the in-situ acid treatment utilizes acetic acid, citric acid, or the like. Optionally, the pretreatment may further comprise inorganic sequestering through the use of one or more sequestering agents, for example, kaolin. The pretreatment may be injected into the barrel of the rotary biomass dryer immediately after the feeding device.

In the method and apparatus of the present disclosure, the rotary biomass dryer subjects the moisture-containing biomass material to hydrolysis and steam explosion. The reflux condenser subjects the dry biomass material to recapture carbonization and removes steam from the apparatus. The aftercooler stage subjects the dried biomass material to cooling condensation. The reflux condenser may also be used in other biomass processing equipment systems that utilize other biomass processing components, including without limitation extruders, pelletizers, and briquetters.

A rate at which the moisture-containing material is provided to the feeding device may be uniform in one variation of the present disclosure. When desired, more than one type of moisture-containing biomass material may be mixed together at the time of, or prior to, entering the apparatus through the feeding device.

According to another aspect of the present disclosure, a conventional screw press, also known as a dewatering press, may be used to denature or remove excess water by hydraulically or mechanically expelling the moisture-containing biomass material through a tapered screw/screen filter arrangement that diverts excess water prior to the moisture-containing biomass material being fed into the rotary biomass dryer.

According to yet another aspect of the present disclosure a biomass material is dried according to the method and/or using the apparatus described above and further disclosed herein. When the biomass material is dried using the apparatus of the present disclosure, the apparatus may subject the biomass material to an auto acid hydrolysis zone, a hydrolysis zone, a steam explosion zone, a recapture carbonization zone, and/or a cooling condensation zone, either individually or in any combination.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings in which.

Figure 1:
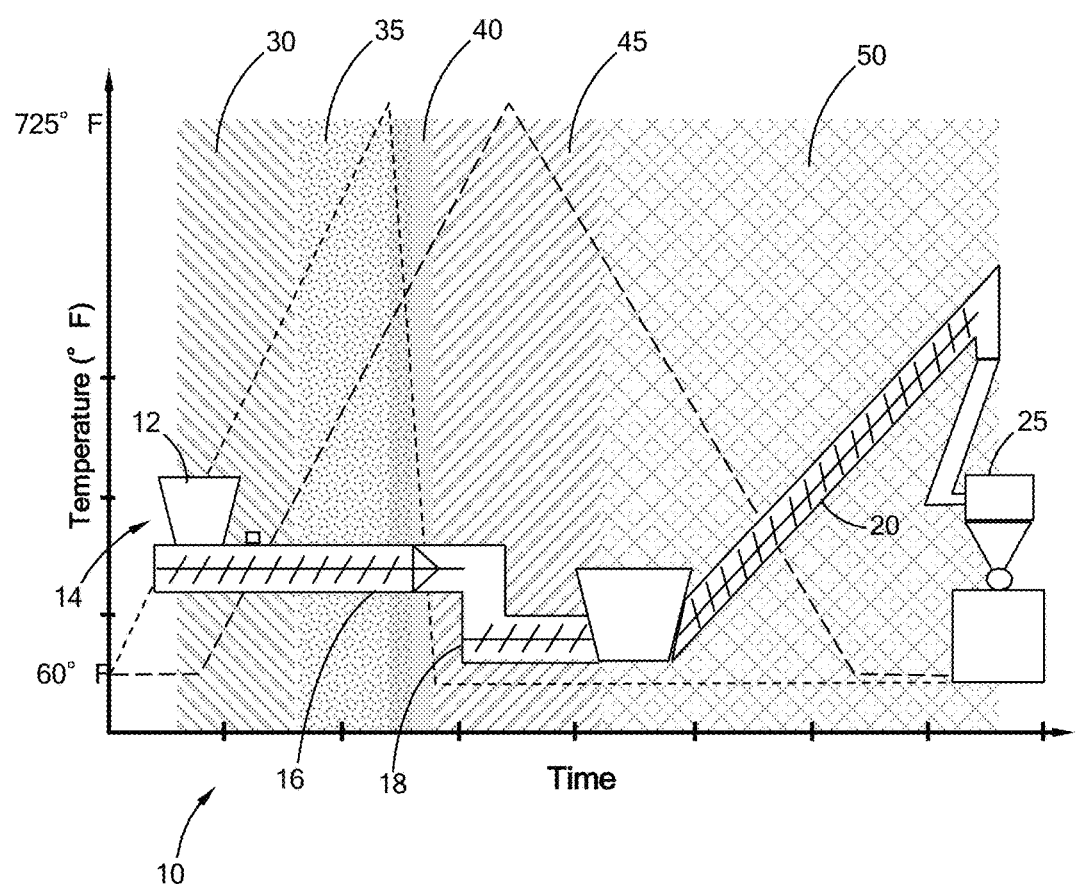
FIG. 1 is a schematic representation of a rotary biomass dryer apparatus adapted according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure addresses the drying of moisture-containing or water laden biomass materials by providing an apparatus and method that adapts a rotary biomass dryer to incorporate or adopt one or more pretreatment methods and/or a reflux condenser. Pretreatment provides a means to remediate undesirable chlorides and salts present in especially some non-woody biomass materials followed by drying in a rotary biomass dryer with acid injection to facilitate the breakdown of certain cellulose. Biomass materials are generally a mixture of three basic cellulosic materials, namely, cellulose, hemicellulose and lignin. According to one aspect of the present disclosure, the pretreatment is performed after commutation by immersing the biomass materials in water followed by mechanical dewatering to solubilize salts and nutrients, comprising ions of chlorine (Cl), nitrogen (N), potassium (K), and/or phosphorus (P).

A rotary biomass dryer can function as a hydrolysis processor or steam dryer as it uses the heat of compression in the Second Law of Thermodynamics to produce steam thereby effectively drying with interstitial bound and unbound or added water. The drying of biomass materials falls into two broad categories or ranges, namely, non-destructive drying and destructive drying. The rotary biomass dryer typically functions in the non-destructive range, up to a temperature of about 350° F. Within this temperature range, both unbound waters and bound waters are released from the biomass materials. Drying above about 350° F. is considered destructive drying because it creates biochar.

Referring to FIG. 1, an apparatus 10 of the present disclosure generally comprises a feeding device 12, a feed throat 14, a rotary biomass dryer 16, a reflux condenser 18, an aftercooler 20, and an exit mechanism 25. Along the length of the apparatus 10, various portions may also be described to comprise various zones, namely, an auto acid hydrolysis zone 30, a hydrolysis zone 35, a steam explosion zone 40, a recapture carbonization zone 45, and a cooling condensation zone 50. Some of these zones may overlap with one another as shown with respect to the hydrolysis zone 35 and the steam explosion zone 40. Biomass material may be introduced to any of these zones either individually or in any combination. Further details associated with the rotary mass dryer are described in U.S. Pat. No. 8,667,706, which is commonly assigned with the present application, and the entire contents of which are hereby incorporated by reference in their entirety.

In another form of the present disclosure, pretreatment of biomass materials includes without limitation in-situ acid or basic treatment, e.g., auto acid hydrolysis. The in-situ acid treatment of the biomass materials within the non-destructive temperature range using predetermined acid compositions that include without limitation, acetic acid, citric acid, or the like, provides a means to improve the production of fixed carbon while enhancing moisture content. The in-situ hydroxide treatment using predetermined basic compositions that include, by way of example, any hydroxide such as sodium or calcium hydroxide, or any ammonia. An acid/water mixture, or a hydroxide/water mixture, may be injected into a barrel of the rotary biomass dryer 16 immediately after the feeding device 12 in order to increase exposure time. Acid injection catalyzes the hydrolysis in conjunction with elemental iron and/or the acids serve to dehydrate and solubilize halogen elements (e.g., chlorine) and alkali metals (e.g., sodium, potassium, etc.), as well as flash-off the corresponding salts (e.g., KCl) and/or NaCl) along with the steam. This acid treatment also increases the amount of fixed carbon present in the biomass materials, which may be desirable for some applications.

Additionally, in another form acidic and basic materials, such as any hydroxide such as sodium or calcium hydroxide or any ammonia, are introduced to the biomass materials while being processed through the rotary biomass dryer 16. Acidic and basic chemicals act to catalyze the breakdown of lignin, hemicellulose and cellulose of lignocellulosic biomass. This breakdown of the lignin, hemicellulose and cellulose results in the carbonization of biomass. When using organic acids such as acetic, formic, citric and the like in the rotary biomass dryer 16 to process to treat corn stover, BTU content was increased from 7,650 BTU/lb in raw stover to 8,395 BTU/lb in a partially carbonized sample of corn stover. In processing runs without the use of acids, the heat capacity of the partially carbonized corn stover was only 8,060 BTU/lb. The use of organic acids in the rotary biomass dryer 16 with corn stover also resulted in a moisture content decrease and a fixed carbon increase compared to stover that was not treated with acid in tandem to the rotary biomass dryer 16. Samples of raw corn stover were analyzed at 10% moisture content and 20.2% fixed carbon. The use of organic acids increased the fixed carbon composition of the corn stover to 29% and decreased the moisture content to 2.5%, while the fixed carbon composition of the stover without acid treatment did not increase and the moisture content only decreased to 6.8%. When using basic chemicals in tandem with the rotary biomass dryer 16 and oak sawdust, similar increases in heat capacity are seen as well as a noticeably faster darkening of the color of the material as it was being processed compared to processing without the addition of chemical, indicating a faster carbonization rate.

According to another aspect of the present disclosure, the biomass materials may contain inorganic materials derived from silicic acid, in the form of silica, plant nutrients, and chlorides. Under certain conditions, these inorganic materials may result in a film or glazing being formed on the boiler walls. In the present disclosure, inorganic sequestering may be utilized as an additional pretreatment to effectively tie up the silica and chloride in the resulting ash that is formed. Such inorganic sequestering may be accomplished by the addition of sequestering agents to the biomass materials in the process of the present disclosure.

The rotary biomass dryer 16 in one form employs a uniform feed rate in order to improve efficiency, or to achieve a more uniform flow rate. According to additional aspects of the present disclosure, which are described in greater detail below, one or more feed improvements such as variations of the feeding device 12 as a funnel feeder or crammer feeder, an in-feed mixer, a preheater, and a dual-belt feeder may be utilized to enhance the uniformity of the flow rate. The funnel feeder and crammer feeder forms provide a feeding device that increases the bulk density of the biomass materials as they enter a screw of the rotary biomass dryer 16. An in-feed mixer may also be employed, which is a combination or use of two or more feed units in combination with a mixer to mix different biomass materials together. A variety of biomass materials are available and mixing of some of these biomass materials together may be advantageous due to seasonal supply for improvement of certain properties such as BTU content or the like. A preheater may also be utilized to deploy waste heat generated by the process back to the feeding device 12 in order to temper the incoming biomass materials entering the feed throat 14.

Figure 2A:
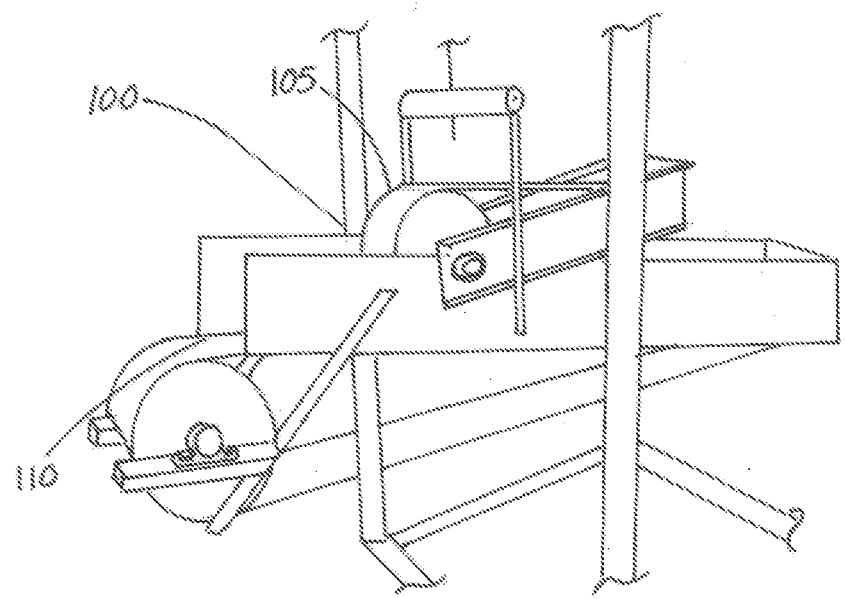
FIG. 2A is a perspective view of a dual-belt feeder that may be utilized in the apparatus according to the teachings of the present disclosure.
Figure 2B:
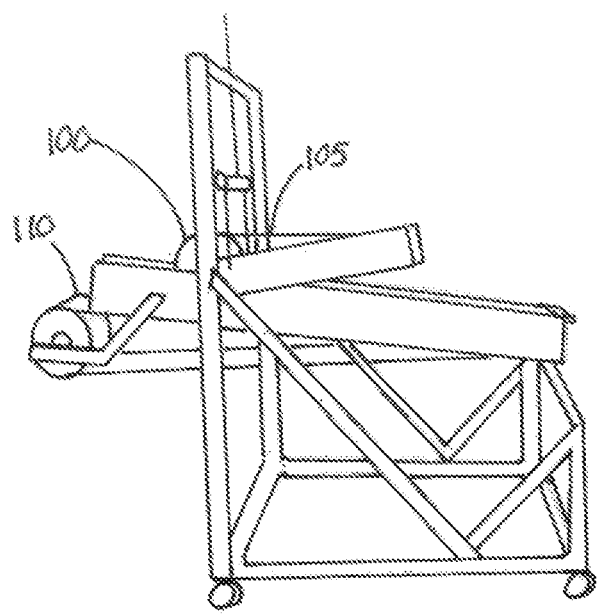
FIG. 2B is a perspective side view of the dual-belt feeder of FIG. 2A.

Referring now to FIGS. 2A and 2B, a dual-belt feeder 100 may be utilized that levels the inflow of biomass material by raking/leveling with a top belt 105 while the lower belt 110 provides metered feed provisions to the feed throat 14 of the rotary biomass dryer 16. The dual-belt feeder 100 provides for both improved metering and feeding functions.

The rotary biomass dryer 16 defines a compression screw (see U.S. Pat. No. 8,667,706), however, this configuration is output limited by a root diameter of a feed section. A multiple screw design with co-rotating or counter-rotating screws may be employed according to the teachings of the present disclosure in order to to provide increased throughput. Alternatively, a fixed screw design with a rotating barrel may be used to improve efficiency.

Since the rotary biomass dryer 16 is a steam dryer, generating steam by flashing off both bound and unbound water, excessive heat build-up may control issues with the screw due to steam forming too early in the process. According to another aspect of the present disclosure, this issue can be addressed by incorporating a blind aperture from a drive end (the front/loading end), such as, but not limited to near a compression zone of the screw, with appropriate provisions for receiving a liquid filter. Further, in another form, a hollow rod/device may be used to deliver cooling fluid to an opposite end of the blind aperture.

According to yet another aspect of the present disclosure, tandem dewatering methods may be utilized. These methods include using a conventional dewatering and screw press to denature or remove excess water by hydraulically or mechanically expelling the water laden material through a tapered screw/screen filter arrangement. After the water is diverted, the expressed material may be fed directly into the rotary biomass dryer 16.

Figure 3A:
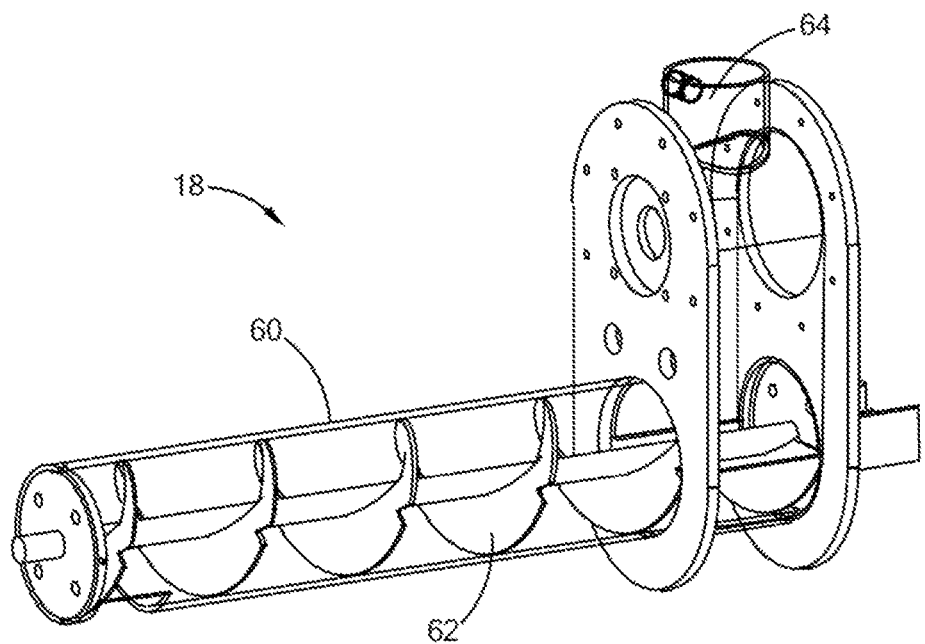
FIG. 3A is a schematic representation of a reflux condenser that may be combined with the apparatus of the present disclosure.

Referring now to FIG. 3A a reflux condenser 18 is shown that comprises a column-like device device, such as but not limited to an auger 60, to move the biomass material. The auger 60 includes a member, such as a plate or a blade 62, over which some of the evaporated materials provide a gas blanket and flow back through the rotary biomass dryer 16 in order to inhibit the contents of the apparatus 10 from combusting and to provide material for recapture carbonization wherein the volatiles released during steam explosion are condensed into the solid material 45 (see FIG. 1). The reflux condenser 18 also comprises a port 64 through which the evaporated excess water is removed, forced, or pulled from the apparatus prior to the biomass material losing an excessive amount of heat.

Figure 3B:
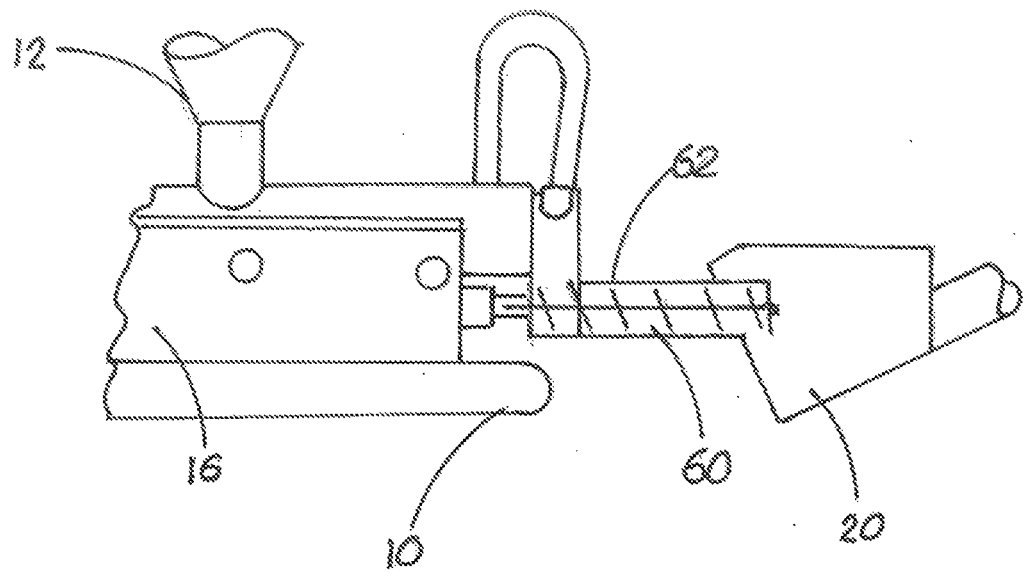
FIG. 3B is a side view of the reflux condenser of FIG. 3A shown in context with the biomass dryer according to the teachings of the present disclosure.

Referring now to FIGS. 1 and 3B, the reflux condenser 18 is located in the apparatus 10 between the rotary biomass dryer 16 and the aftercooler stage 20. It should be understood, however, that the reflux condenser 18 is not limited to use in tandem with a rotary biomass dryer 16 and instead may be employed with any biomass processing component, such as by way of example, extruders, pelletizers, or briquetters, to form a biomass processing equipment system, while remaining within the scope of the present disclosure.

The aftercooler stage 20 is utilized to lower the temperature of the dried biomass materials prior to the dry materials exiting the apparatus 10 through the exit mechanism 25 or port. Any gases, and in some forms any uncondensable gases, including but not limited to CO, $CO_2$, $H_2$ may be processed in a subsequent thermal oxidizer.

In another method of the present disclosure, the dried biomass materials exiting the apparatus 10 may be further compacted into a dense and ready-to-transport shapeform.

Figure 4:
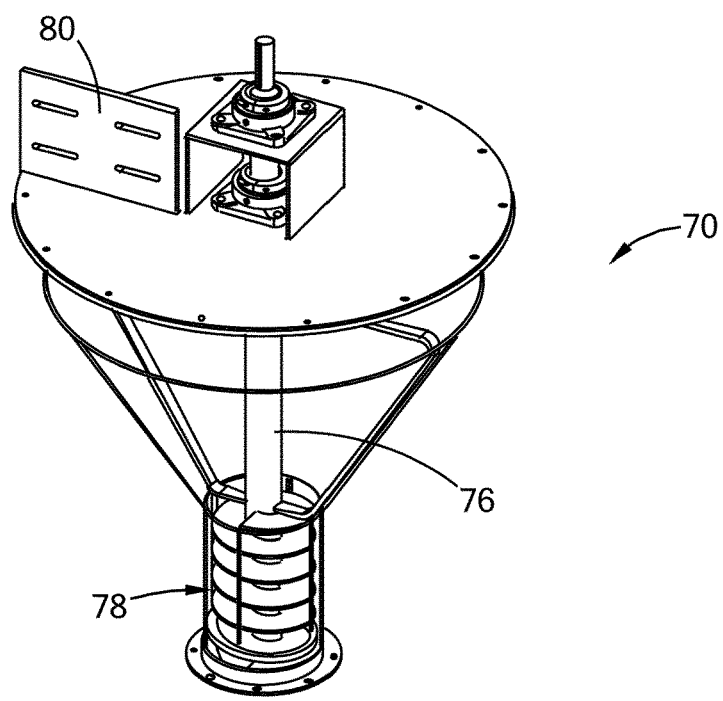
FIG. 4 is a perspective view of one form of a crammer feeder having a funnel configuration constructed in accordance with the teachings of the present disclosure.
Figure 5:
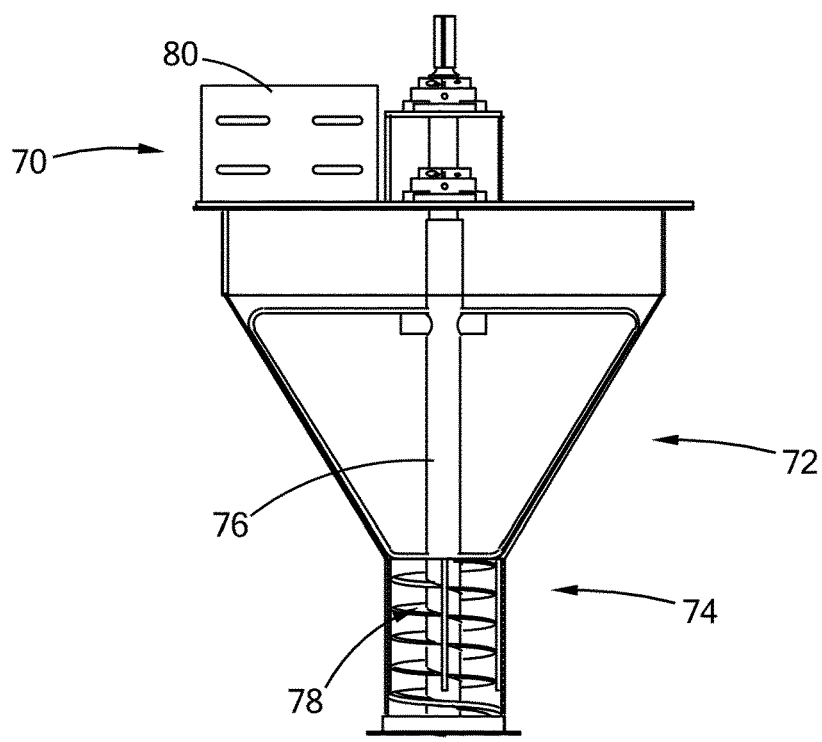
FIG. 5 is a side cross-sectional view of the crammer feeder of FIG. 4.

Referring now to FIGS. 4 and 5, one form of the feeding device 12 as a crammer feeder with a funnel configuration is illustrated and generally indicated by reference numeral 70. As shown, the funnel feeder 70 includes a tapered proximal portion 72 and a cylindrical distal end portion 74. A shaft 76 extends through the funnel feeder 70 and is driven by a motor (not shown). The shaft 76 further comprises an auger 78 in order to feed the biomass materials into the rotary biomass dryer 16. Optionally, a bracket 80 is used to mount the funnel feeder 70 to an adjacent component of the apparatus 10, such as by way of example, the motor. It should be understood that this crammer feeder device in the form of a funnel feeder is merely exemplary and should not be construed as limiting the scope of the present disclosure. Other types of feeders as set forth herein, in addition to vibratory feeders and gravity feeders may also be employed while remaining within the scope of the present disclosure.

Testing

Two different moisture-containing biomass materials were tested using the apparatus and methods according to the present disclosure, namely, corn stover and oak sawdust. As shown in Table 1 below, the corn stover and oak sawdust processed through the apparatus of the present disclosure demonstrated higher BTU/lb while reducing overall volatile matter:

TABLE 1

| Output Characteristic Proximate/Elemental | Analytical Method | Corn Stover - Unprocessed | Corn Stover - After RCU/RC Processing | Oak Sawdust - Unprocessed | Oak Sawdust - After RCU/RC Processing |
|---|---|---|---|---|---|
| Ash (wt. %) | ASTM D1102 | 10.79 | 16.97 | 1.50 | 13.67 |
| Volatile Matter (wt. %) | ASTM D3175 | 69.00 | 55.44 | 80.59 | 50.91 |
| Fixed Carbon (wt. %) | ASTM D3172 | 20.21 | 27.59 | 17.92 | 35.43 |
| Sulfur (wt. %) | ASTM D4239 | 0.13 | 0.10 | 0.01 | 0.10 |
| ross Calorific Value (BTU/lb) | ASTM E711 | 7650 | 8831 | 8381 | 9254 |
| Carbon (wt. %) | ASTM D5373 | 43.93 | 51.50 | 49.60 | 54.39 |
| Hydrogen (wt. %) | ASTM D5373 | 5.32 | 4.46 | 5.85 | 4.27 |
| Nitrogen (wt. %) | ASTM D5373 | 1.18 | 1.40 | <0.20 | 1.12 |
| Oxygen (wt. %) | ASTM D5373 | 38.65 | 25.57 | >42.83 | 26.45 |

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated.

What is claimed is:

1. A method of drying a moisture-containing biomass material, the method comprising:
   using an apparatus comprising:
      a feeding device;
      a rotary biomass dryer;
      a reflux condenser;
      an aftercooler; and
      an exit mechanism;
   feeding the moisture-containing biomass material into the feeding device;
   pretreating the biomass material;
   heating the moisture-containing biomass material in the rotary biomass dryer to separate the moisture-containing biomass material into steam and dry biomass material at a temperature at or below 350° F.;
   removing the steam from the apparatus as the steam and the dry biomass material passes through the reflux condenser;
   cooling the dry biomass material in the aftercooler; and
   collecting the dry biomass material after exiting the apparatus through the exit mechanism.

2. The method according to claim 1, wherein the pretreating includes at least one of in-situ acid and basic treatment.

3. The method according to claim 2, wherein the in-situ acid treatment utilizes at least one of acetic acid and citric acid.

4. The method according to claim 2, wherein the pretreating further comprises inorganic sequestering through the use of one or more sequestering agents.

5. The method according to claim 1, wherein a pretreatment is injected into the barrel of the rotary biomass dryer immediately after the feeding device.

6. The method according to claim 1, wherein a rate at which the moisture-containing biomass material is provided to the feeding device is uniform.

7. The method according to claim 1 further comprising mixing more than one moisture-containing biomass material together at a time of or prior to entering the apparatus through the feeding device.

8. The method according to claim 1 further comprising a step of compacting the biomass materials exiting the apparatus.

9. An apparatus for drying a moisture-containing biomass material, the apparatus comprising:
   a feeding device;
   a rotary biomass dryer operating at a temperature at or below 350° F. such that the biomass material does not become biochar;
   a reflux condenser;
   an aftercooler stage; and
   an exit mechanism.

10. The apparatus according to claim 9, wherein the feeding device is selected from the group of a crammer feeder, an in-feed mixer, a preheater, and a dual-belt feeder.

11. The apparatus according to claim 9, wherein the feeding device is a crammer feeder having a funnel configuration.

12. The apparatus according to claim 10, wherein the feeding device is a dual-belt feeder comprising a top belt that levels an inflow of moisture-containing or water-laden biomass material by raking, and further comprising a lower belt that provides metered feed provisions to the rotary biomass dryer.

13. The apparatus according to any of claim 9, wherein the rotary biomass dryer comprises a screw system selected from the group consisting of multiple screws and a fixed screw with a rotating barrel.

14. The apparatus according to claim 9, wherein the rotary biomass dryer includes a screw with a compression zone having a blind aperture open to a drive end, wherein a hollow device is used to deliver cooling fluid to an opposite end of the blind aperture.

15. The apparatus according to claim 14, wherein the blind aperture is proximate a compression zone end of the screw.

16. The apparatus according to claim 15 further comprising a liquid filter.

17. The apparatus of according to claim 1, wherein the apparatus further comprises a mixer located upstream of the feeding device.

18. The apparatus according to claim 1 further comprising an auto acid hydrolysis zone, a hydrolysis zone, a steam explosion zone, a recapture carbonization zone, and a cooling condensation zone.

* * * * *